United States Patent [19]

Sachot

[11] Patent Number: 4,478,540

[45] Date of Patent: Oct. 23, 1984

[54] SPINDLE HEAD ASSEMBLY WITH OBLIQUE AXIS OF ROTATION

[75] Inventor: Michel Sachot, Saclay, France

[73] Assignee: Centre D'Etudes Du Fraisage, Bagneux, France

[21] Appl. No.: 388,999

[22] Filed: Jun. 16, 1982

[30] Foreign Application Priority Data

Jun. 19, 1981 [FR] France ................................ 81 12097

[51] Int. Cl.³ .............................................. B23C 1/12
[52] U.S. Cl. ..................................... 409/211; 409/204; 409/206; 409/216
[58] Field of Search ............. 409/216, 211, 213, 215, 409/204, 201; 29/26 R, 39, 40, 48.5 R, 48.5 A; 173/163; 408/35, 117; 82/36 A, 25, 86

[56] References Cited

U.S. PATENT DOCUMENTS

| | | | |
|---|---|---|---|
| 2,660,074 | 11/1953 | Wilson | 409/903 X |
| 2,685,122 | 8/1954 | Berthiez | 409/204 X |
| 3,359,861 | 12/1967 | Johnson et al. | 409/211 |
| 3,823,644 | 7/1974 | Mello | 409/204 |
| 3,828,649 | 8/1974 | Lecailtel et al. | 409/201 X |
| 4,378,621 | 4/1983 | Babel | 409/211 X |

FOREIGN PATENT DOCUMENTS

| | | | |
|---|---|---|---|
| 2410534 | 11/1977 | France | 29/568 |
| 2026365 | 2/1980 | United Kingdom | 82/36 A |

*Primary Examiner*—William R. Briggs
*Assistant Examiner*—Glenn L. Webb
*Attorney, Agent, or Firm*—Darby & Darby

[57] ABSTRACT

A spindle head can rotate on a support about an axis which forms, with the working plane, an angle α which advantageously equals 35° 15′52″; the angle between axis of the spindle itself and the axis of rotation of the head is the complement of angle α. The projection of the axis of rotation of the head on the working plane is slanted in relation to the horizontal projection of the main axis of advance, with a slant that is preferably equal to 45°.

15 Claims, 10 Drawing Figures

SPINDLE HEAD ASSEMBLY WITH OBLIQUE AXIS OF ROTATION

Present-day developments in machine-tool technology tend to respond to industry's productivity needs, by producing machines capable of a high degree of automation via the automatic programming of machining operations and tool changes.

It has long been known to link an automatic tool changer with a machine tool.

However, in order to increase the productivity of machine tools, the trend is toward designing machines in which the regulation of spindle position can be carried out automatically. This leads either to multispindle heads or to single-spindle heads with two working positions, one horizontal, the other vertical. Mechanical means are provided for automatically carrying out the change in position and the indexing (the rigorous immobilization of the spindle head in relation to its support) in each of these positions.

The result is a single-spindle machine having a horizontal working position and a vertical working position, with automatic control of position-change and rigorous indexing. A tool changer can then be designed to operate when the spindle is in one of these positions.

Nonetheless, presently known machines of that type have a number of disadvantages.

Machines in which the axis of rotation of the spindle head, in relation to its support, is parallel to the machine's horizontal working plane, present the disadvantage that there is a great distance between the horizontal-plane projections of the spindle nose, in its vertical and horizontal positions, said distance equalling the radius of the turret, which can reach 15 to 20 cm.

In the Hure-type machines, also called "universal head" machines, in which the spindle head rotates along an axis that is inclined 45°, that distance may be considerably shortened. On the other hand, if such a head is mounted on a ram or support, with lateral guide ways, the tool mounted on the spindle interferes with the guide ways, when passing from one position to the other.

Finally, and most importantly, these machines only permit a single position with a horizontal spindle. However, automatic machining of complicated or heavy parts is greatly facilitated if the spindle head has two horizontal working positions, forming between them a large angle (preferably one of 90°) and forming with the vertical working position a trihedron (preferably rectangular), one of these positions being parallel to the main advance axis, thus yielding three working positions that are parallel to the three main axes of the machine.

One previously proposed device permits positioning the work piece by rotating the work-clamping table, so that the surfaces to be machined are parallel to a system of orthogonal coordinates, at a constant height in relation to the base of the device.

Such a device, described in the Patent of the German Federal Republic No. 1 552649, in the name of Oerlikon, features a work-clamping table, a pedestal and a tabular assembly. The pedestal forms an angle $\alpha$ of 35°15′53.4″ with the foot mounted on said pedestal, and the work-clamping table forms, with the foot mounted on the table, the same angle $\alpha$. The two feet are mounted at the ends of the tubular assembly; the work-clamping table can rotate around the axis of the tubular assembly.

However, such a device, which is designed to allow working along three orthogonal planes, by means that avoid the use of complicated and expensive machine-tools, permits neither great precision, nor automatic operation.

According to the invention, the spindle head rotates about an axis that is slanted in two directions. Preferably, the axis forms with the machine's horizontal working-plane an angle that is between 30° and 40°, and most advantageously equal to about 35°15′52″ ($\alpha = \arctan\sqrt{2}/2$). The angle between the axis of the spindle and the axis of rotation of the head has a value equal to the complement of $\alpha$. The horizontal projection of the head's axis of rotation is slanted, preferably by 45°, to the projection of the main axis of advance. Preferably, there is provided means for the automatic control of head-rotation, together with means for indexing in three positions, 120° apart, corresponding to the horizontal and vertical positions of the spindle.

In addition to the previously mentioned advantages, this arrangement makes it possible to provide a horizontal tool-changing position, distinct from the vertical position and from the horizontal position parallel to the axis of advance. This makes for easier tool changes, in a position in which the tool does not run the risk of interfering with the work piece—which facilitates the location of the tool changer.

If the spindle is mounted on a ram that slides horizontally, parallel to the main axis of advance, the two horizontal directions are thus, respectively, parallel and perpendicular to the horizontal sliding direction of the spindle-carrying ram.

The rotational drive of the spindle-carrying head may be carried out in various ways, in particular with a ring gear driven by a pinion, or by a pinion driven by a worm or rack. By the same token there are available, to those skilled in the art, methods for locking the head in a precise angular position, notably by means of ring gears with front teeth, of the type known as "curvic coupling"; the invention is not limited to a specific method of driving and/or indexing.

By the same token, various known systems of tool changers may be combined with or adapted to the invention. In accordance with the invention, there are available two horizontal positions, of which one can be used as a tool-changing position, avoiding the problems caused by interference of the tool changer with the spindle in the horizontal working position.

The invention is described below in greater detail, with reference to the attached drawings, in which.

Figure 1:
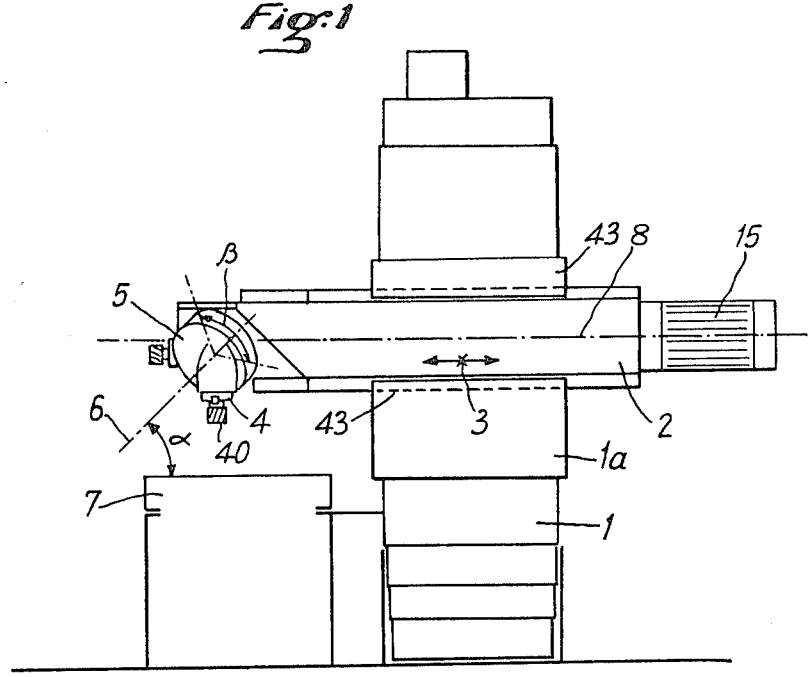
FIG. 1 is a schematic lateral view of a machine-tool, according to the invention.
Figure 2:
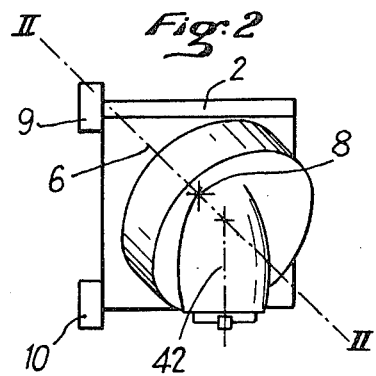
FIGS. 2, 3 and 4 are schematic front views of the ram equipped with the spindle-carrying head, in its three positions.
Figure 3:
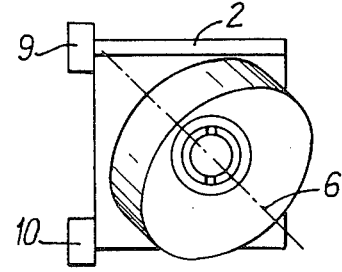

With reference to FIGS. 1 to 8, it can be seen that the machine according to the invention features a ram 2 equipped with a head of the rotary single-spindle type, carrying a spindle 4, driven in all angular positions of the head, as are all heads of that type. The ram can travel in the direction of arrow 3. The main axis of advance of spindle 4 by motor 15 is shown at 8.

In the example shown, ram 2 is mounted so as to slide on lateral guide ways 9, 10 on a machine tool 1, e.g., via a knee 1a, capable of sliding vertically on the structure of the machine, which knee carries guide ways 43. The table 7 has a horizontal working plane.

In accordance with the invention, single-spindle head 5 is mounted so as to rotate about an axis 6 on ram 2. Axis 6 is inclined in relation to the horizontal working plane of table 7, by an angle $\alpha$ on the order of 35°15′52″ (arctan$\sqrt{2}/2$) the angle between axis 42 of spindle 4 and axis 6 equals the complement of $\alpha$.

Furthermore, the vertical plane that contains axis 6 forms, with the vertical plane that contains axis 8, an angle $\alpha$ (FIG. 8) on the order of 45°.

Figure 4:
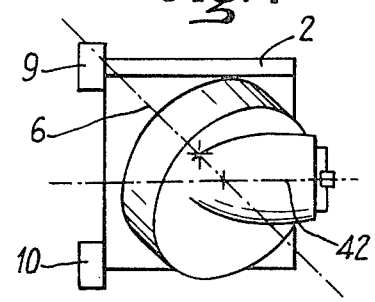
Figure 5:
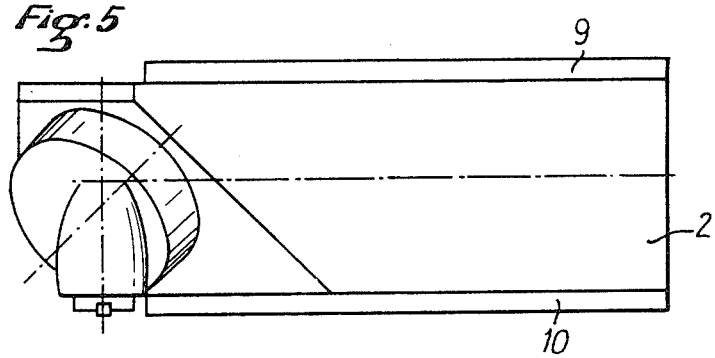
FIGS. 5, 6 and 7 are schematic lateral views, illustrating the same positions.
Figure 6:
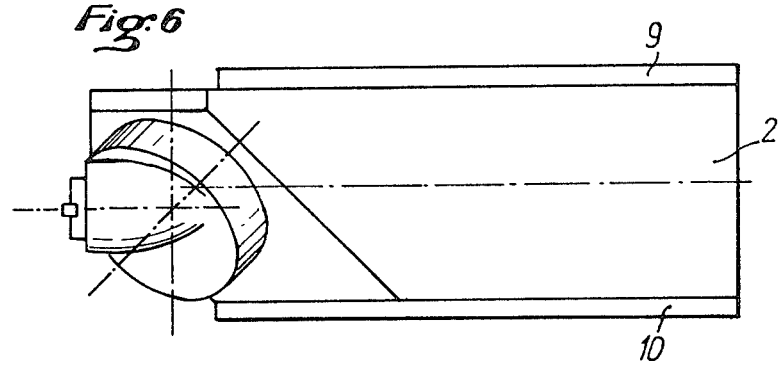
Figure 7:
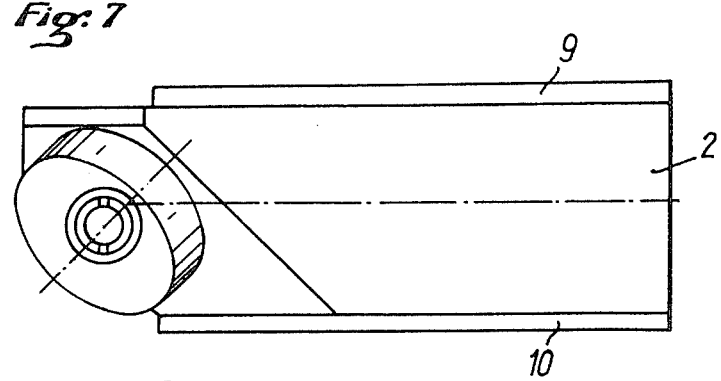
Figure 8:
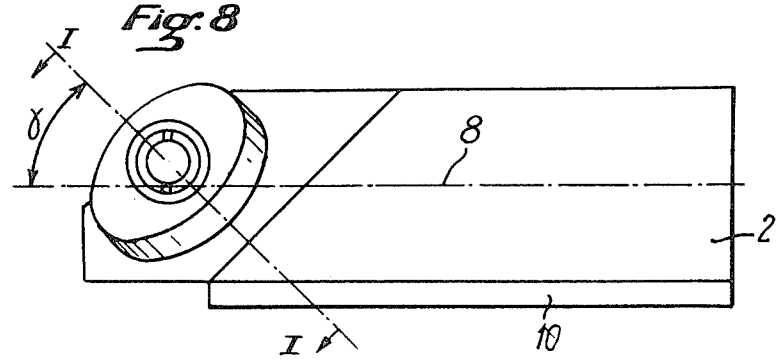
FIG. 8 is a view of the ram below.

If angles $\alpha$ and $\gamma$ have precisely the values cited above, the rotation of head 5 around its axis 6 lets spindle 4 assume a vertical position (FIGS. 2 and 5), a horizontal position with its axis parallel to axis 8 (FIGS. 3 and 6), and a horizontal position with its axis perpendicular to axis 8 (FIGS. 4 and 7).

Heretofore, no such machine had been built. Some single-spindle machines feature indeed a vertical working position and a horizontal position along two of the main axes of the machine (but not along the three main orthogonal axis), either by using a head that rotates about a horizontal axis, or by using a head that swivels (in known fashion) about an axis inclined 45° in relation to the horizontal and located in the vertical plane that contains the axis of advance.

But, so far no one has proposed a single-spindle head swiveling along a axis that is slanted (along the angles defined above) simultaneously in two directions, thus making it possible to obtain a working position along each of the three main axes of the machine, and doing so with a single swiveling axis of the head. The advantage of such a design is that it makes it possible to automate milling along three axes of spatial coordinates, of which at least two are rectangular. This permits complete automatic machining of complicated parts without having to move them on the work table.

Indeed, by providing means for the automatic control of the rotation of head 5 and for locking said head in precise predetermined positions, one obtains a machine tool with a head that is automatically indexable along three working positions arranged in a rectangular trihedron, along the three main axes of the machine. One of these positions can be used to carry out an automatic tool change, while the two other are free of interference with the tool-changing device.

Such means for automatic control and locking have already been described and used in connection with a number of rotary heads, be they single-spindle or multispindle, as has the combination of such heads with a tool chamber, in particular in U.S. Pat. No. 3,238,615 and French Pat. Nos. 1,556,941 and 2,255,142. They require no further description.

Figure 9:
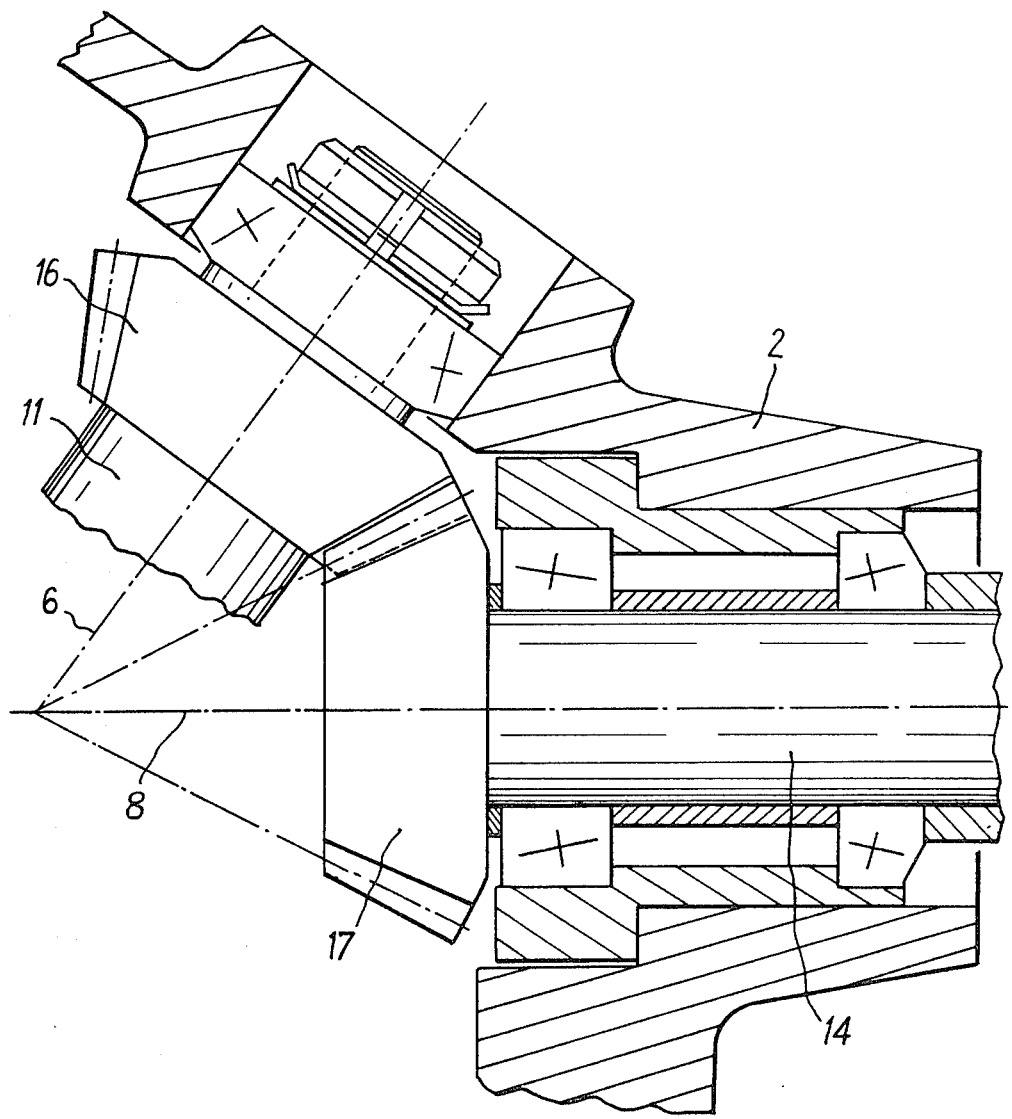
FIG. 9 is a view in partial section along II—II of FIGS. 2, 3, 4.
Figure 10:
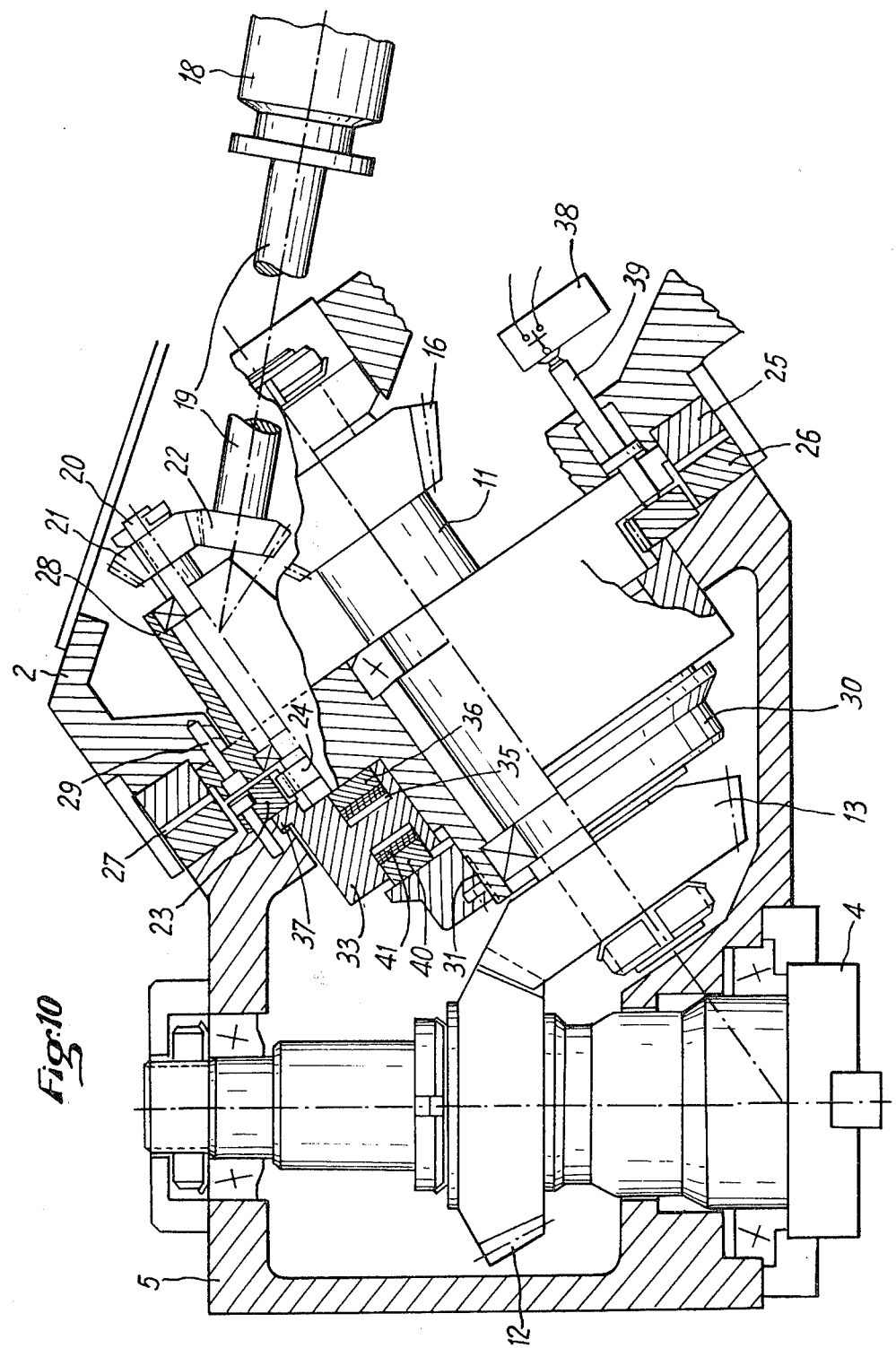
FIG. 10 is a view in partial section along I—I, of FIG. 8.

FIGS. 9 and 10 illustrate, however, one of the possible mechanical embodiments.

FIG. 9 shows that, on main drive shaft 14, carried by ram 2 and driven by motor 15, there is mounted a pinion 17 that drives pinion 16, mounted on shaft 11, located along axis 6 of the head. The angle between axes 8 and 6 is not $\gamma$. $\gamma$ is the angle between the horizontal projections of these axes.

FIG. 10 shows that shaft 11 drives pinions 12 and 13, and hence spindle 4. Head 5 is mounted so as to swivel around shaft 11. Its rotation is ensured by shaft 19 which is driven by, say, motor 18 and which drives shaft 20 via pinions 21, 22. Shaft 20 drives pinion 24 which operates in conjunction with ring gear 23, provided in head 5.

Locking in position is ensured by flat toothed ring-gears 25 and 26, one integral with ram 2, the other with head 5, whose number of teeth is such that, after rotating the desired angle $\beta$ (FIG. 1), the teeth of the two ring gears are located facing one another (curvic coupling system). In the example shown, in which $\alpha$ has precisely the value specified, the rotations of the head, in order to pass from one position to the next, are all equivalent to an angle $\beta$ equal to 120°.

In order to permit the rotation of the head, ring gears 25 and 26 are separated; by contrast, they are pressed one against the other in the working position. This can be achieved, in particular, by hydraulic or mechanical means. In the example shown, these means are hydraulic. Application of oil pressure to chambers 35 or 41, underneath pistons 36 or 40 causes, respectively, either the disengagement of the ring gears, or their forceful engagement with each other.

An equivalent way would be to provide the return to the locked position by means of spring action, in lieu of the hydraulic return via chamber 41 and piston 40. For that purpose, it suffices to replace piston 40 by one or more springs that push washer 33 towards ram 2.

If $\alpha$ is not precisely equal to 35°15′52″, yet is between 30° and 40° there still are two horizontal positions and one vertical position, but the two horizontal positions are not orthogonal. Preferably, $\alpha$ is selected as a function of $\alpha$ such that one of the two horizontal positions is parallel to one of the three main axes of the machine, e.g., the axis of advance 8, and/or the axis of slide of ram 2, and/or the direction perpendicular to the longitudinal direction of the table. The other horizontal position will form, with the preceeding one, an angle different from 90°, which can nevertheless be used, in accordance with the invention, as a tool-changing position. Indeed, it is advantageous to use a tool-changing position which is not coaxial with the main horizontal working axis, since that permits a tool-changer arrangement free from interference with the main working positions, which are the vertical position and the horizontal position that is coaxial with the main axis of advance. In particular, this use avoids the problems caused by possible interference between the tool and the work piece during the tool-changing operation.

In any event, an $\alpha$ of between 30° and 40°, preferably about 35°15′52″, leads to a $\alpha$ on the order of 45°, ensuring a rotation of spindle-carrying head 5 that is greatly improved, so far as concerns its interference with the system of lateral guide ways of ram 2. The cone generated by axis 6 upon rotation is indeed very slanted in relation to axis 8. Such a slant separates the spindle from the plane of guide ways 9 and 10, which allows a decrease in the overhang of ram 2, as well as the space it requires, in relation to the plane of the guide ways.

In view of the large number of known arrangements for automatic tool changers, it is not necessary to show such a changer, in order to describe the invention. Thus, one could use the type of changer described by Applicant in its French Pat. No. 77 36028, filed on Nov. 30, 1977.

By the same token, the flat toothed ring-gears may be replaced by another precise locking system, such as a system of the type in which a finger linked with the ram is inserted in a hole provided in the rotary head 5 (or vice versa).

Consequently, one could use, in conjunction with the arrangements of the present invention, the arrangements described in French Pat. No. 81 11914, filed in France on June 17, 1981, according to which the means for locking the head in a specific angular position are of the type that features a pair of diametrically opposite expandable rings. This related case is the subject of a copending and commonly-owned U.S. patent application Ser. No. 389,074, filed June 16, 1982, in the name of Michel Sachot and entitled Improved Machine Tool With Swivelling Head. The disclosure and drawings of this copending application are expressly incorporated herein by reference.

In this example, the head is mounted on a ram that slides horizontally, perpendicular to the table. It goes without saying, however, that the head according to the invention can be mounted on any type of support, stationary or movable in one more directions, and on any type of machine tool.

What is claimed is:

1. A machine tool for machining a workpiece disposed in a working plane comprising:
    support means advanceable along an advance axis disposed in predetermined relation to said working plane;
    a spindle head including a spindle rotatable about a spindle axis, said spindle head being rotatably mounted on said support about a head axis, said head axis being inclined with respect to said working plane at a first angle ($\alpha$) in the range of 30° to 40°, said spindle axis forming an angle with respect to said head axis complementary to said first angle, the projection of said head axis and said support axis on said working plane forming an angle ($\alpha$) of 45° therebetween;
    means for automatically controlling rotation of said head; and
    indexing means for locking said head in three predetermined positions substantially 120° apart, such that in one of said positions said spindle axis is perpendicular to said working plane and in at least another position it is parallel to said working plane.

2. The machine tool according to claim 1 wherein said first acute angle is equal to 35°15'52".

3. The machine tool according to claim 2 wherein said working plane is horizontal, said first position is vertical and said at least another position is horizontal to said working plane.

4. The machine tool of claim 1, wherein the automatic control means comprises a ring gear which is linked to the head and driven by a pinion carried by the support.

5. The machine tool of claims 1, or 4, wherein the locking means comprises fixed and movable flat toothed ring gears, one carried by the support and the other carried by the head, the ring gears being equipped with teeth that correspond after a rotation of 120°, and further comprising means for disengaging the gears to permit rotation and for engaging the gears to permit locking.

6. The machine tool of claim 1, wherein the means for locking comprises a pair of diametrically opposed expandable rings, provided on the support, which rings are insertable in a pair of bores in the head, the head and supports sliding along a plane surface that is perpendicular to the axis of head rotation, under the influence of a drive having a predetermined centering play.

7. A spindle head of universal type adapted for attachment to a support that advances along an advance axis above a working plane, comprising:
    means for rotatably mounting said spindle on said spindle head and rotating it about a spindle axis;
    said spindle head being rotatably mounted on said support about a head axis, said head axis being inclined with respect to said working plane at a first angle ($\alpha$) in the range of 30°–40°, said spindle axis forming an angle with respect to said head axis complementary to said first angle, the projection of said head axis and said support axis on said working plane forming on angle of 45° therebetween;
    means for automatically controlling rotation of said head; and
    indexing means for locking said head in three positions substantially 120° apart, such that in one of said positions said spindle axis is perpendicular to said working plane and in at least another position it is parallel to said working plane.

8. The spindle head according to claim 7 wherein said working plane is horizontal, said first position is vertical and said at least another position is horizontal.

9. The spindle head of claim 7, wherein the first acute angle is equal to arctan $\sqrt{2}/2$.

10. In combination with the spindle head of claim 7, a machine tool of the single spindle universal type in which a support advances along an advance axis above a working plane, the machine tool comprising:
    means for automatically rotating the spindle head about the head axis; and
    means for locking the spindle head in any one of a plurality of predetermined positions.

11. The machine tool of claim 10, wherein a first one and second one of the predetermined positions are parallel to the working plane and a third one of the predetermined positions is perpendicular to the working plane.

12. The machine tool of claim 11 wherein said first one of the predetermined positions is perpendicular to the advance axis.

13. The machine tool of claim 12, further comprising a tool changer operable when the spindle is in said first one of the predetermined positions.

14. The machine tool of claim 10, wherein the locking means comprises:
    a fixed flat ring gear;
    a movable flat ring gear having teeth which mate with the fixed gear in three rotational positions which are separated by 120°; and
    means for separating the fixed and movable gears to permit rotation of the movable gear and engaging the fixed and movable gears to lock the movable gear.

15. The machine tool of claim 10, wherein the automatic rotating means comprises a ring gear linked to the spindle head and a pinion gear engaging the ring gear.

* * * * *